UNITED STATES PATENT OFFICE.

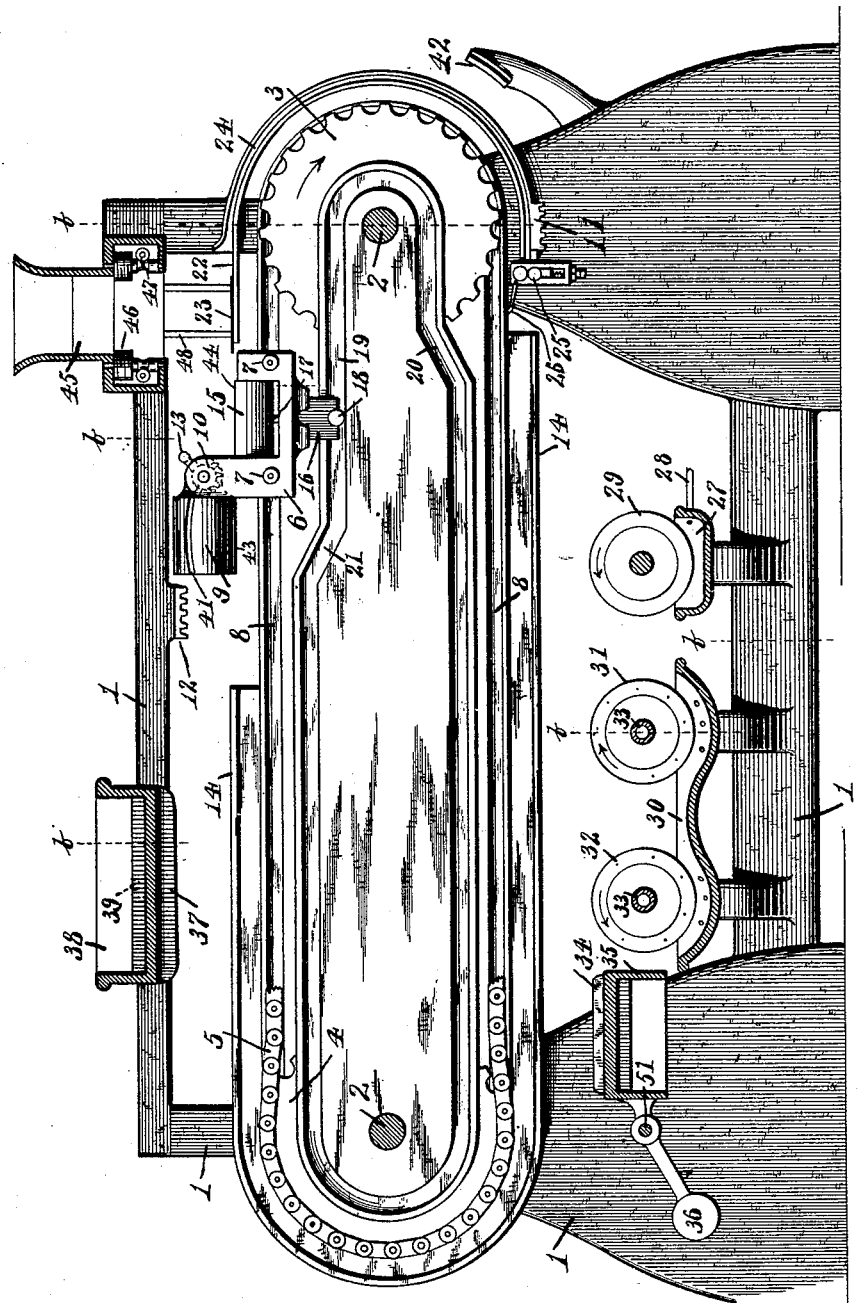

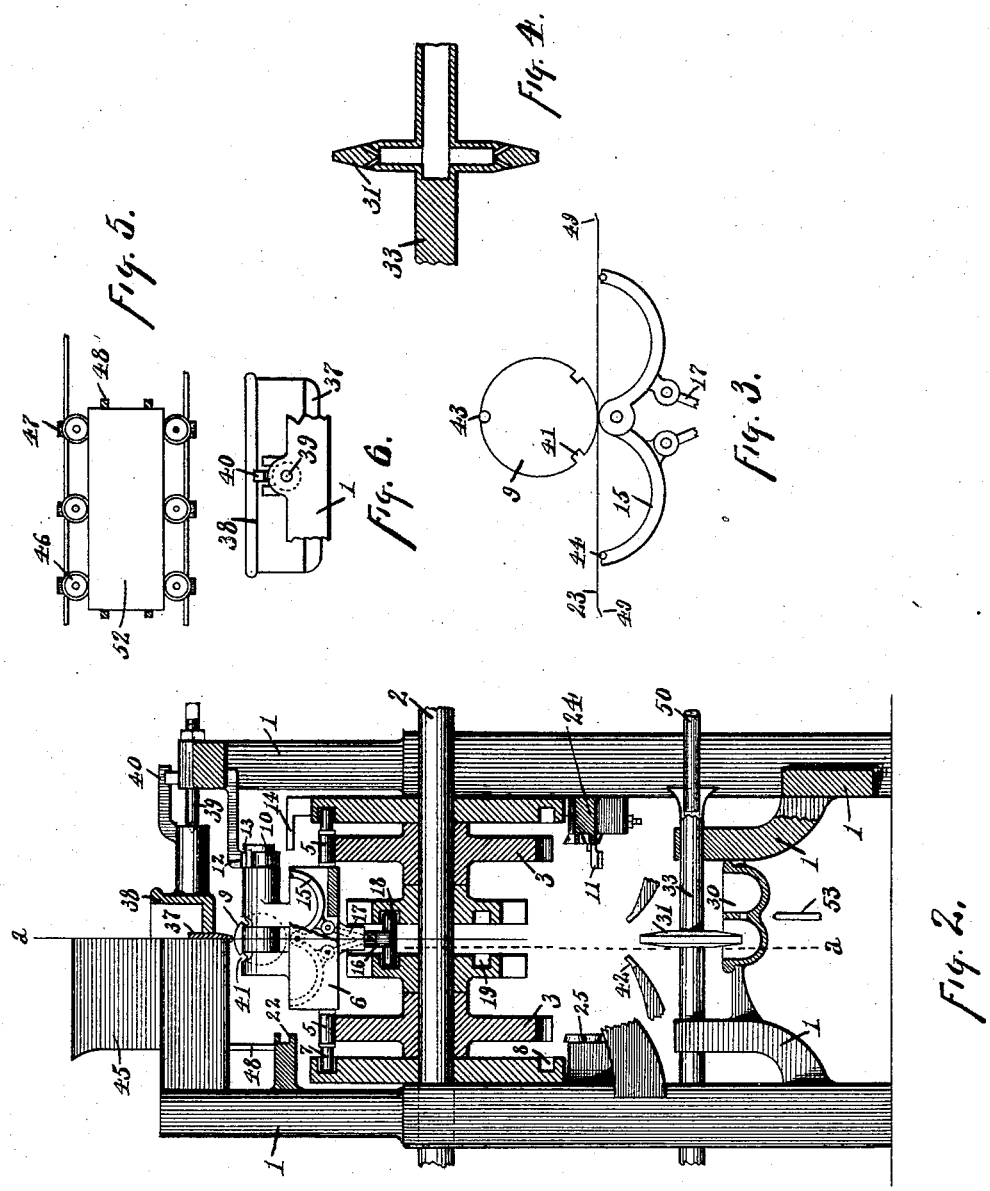

JOHN B. FOOTE, OF HAMILTON, OHIO, ASSIGNOR TO EDWIN NORTON AND OLIVER W. NORTON, OF CHICAGO, ILLINOIS.

CAN-MACHINE

SPECIFICATION forming part of Letters Patent No. 480,256, dated August 9, 1892.

Application filed July 17, 1891. Serial No. 399,806. (No model.)

*To all whom it may concern:*

Be it known that I, JOHN B. FOOTE, of Hamilton, Butler county, Ohio, have invented certain new and useful Improvements in Can-Machines, (Case A,) of which the following is a specification.

This invention pertains to a machine for taking flat sheet-metal blanks and forming them into cylindrical can-bodies and soldering the longitudinal seams thereof. The machine is continuous in its operations, and its capacity is only limited by the number of can-carriages provided in the machine. The can-carriage consists of a cylindrical horn, around which the blank is bent, and a pair of pivoted clamps which bend this blank around the horn and hold it there while being carried past the soldering appliances. The carriages are carried in continuous procession by means of endless chains. The blanks are automatically fed from a pile and one is always in position to be taken by a passing carriage. A passing carriage, with its horn swung back and its clamps open, takes the blank, carries it forward, and passes its ends through rolls which give the ends a slight seam-bevel for the lap and moisten these laps with acid. The horn then takes its place on the blank and the clamps close around the horn, thus bending the blank to form and clamping it upon the horn. The advancing carriage then draws the seam over a revolving disk, which applies liquid resin to the seam, then over a disk which applies solder to the seam, then over a second soldering-disk, and then past a series of soldering-ribs. The clamps then open, and the horn, with a can-body, turns back, the clamps pick up a new blank, and stripping-fingers strip the completed body from the horn. These operations are performed while a single carriage is making the complete circuit of the machine, and the chains may carry as many carriages as is desired, so that all portions of the operation are going on simultaneously upon different carriages.

In exemplifying my machine I show it, for simplicity's sake, as being provided with but a single carriage, which single carriage, however, will serve to illustrate any number which it may be deemed expedient to apply to the chains.

My invention will be readily understood from the following description, taken in connection with the accompanying drawings, in which—

Figure 1 is a vertical section in the plane of line *a* of Fig. 2 of an exemplifying machine embodying my invention, a single carriage only being shown and that one shown in the position just before picking up the blank, the driving-chains being broken away except at the left; Fig. 2, a front elevation of the machine, part vertical section, various parts appearing in vertical section in the plane of the several lines *b* of Fig. 1; Fig. 3, an enlarged front elevation of the horn and clamps, the clamps appearing as open and the horn as in a position over the blank and ready to have the blank bent around the horn; Fig. 4, a vertical diametrical section of one of the soldering-disks upon an enlarged scale; Fig. 5, a plan of the mechanism for feeding the blanks one by one to position to be taken by the carriage-clamps; and Fig. 6, a side elevation of one of the soldering-ribs, showing its manner of mounting.

In the drawings, 1 indicates frame parts, which need no description, as their only office is to furnish rigid supports for the various operative details; 2, a pair of horizontal parallel shafts mounted in the frame and adapted to be rotated by power through any suitable transmitting mechanism; 3, a pair of sprocket-wheels mounted on one of these shafts and turning therewith; 4, a pair of similar sprocket-wheels on the other shaft; 5, a pair of endless carrying-chains engaging these sprocket-wheels; 6, a carriage disposed between the two chains and attached thereto so that as the shafts revolve the carriage will be drawn in an endless path through the circuit of the machine, the single carriage shown in the exemplification illustrating one of a continuous series of carriages which may be applied to the chains; 7, guide studs or rollers projecting sidewise from the carriage; 8, guide-grooves at each side of the machine, engaged by the guide-studs 7 and serving to give steadiness to the movements of the carriage as it is drawn along by the chains; 9, a cylindrical horn pivoted to the carriage, the pivot being parallel with the shafts of the sprocket-wheels, the horn being free to turn upon its pivot so as to lie either forward or back, in either case parallel with the longitudinal path of the carriage; 10, a pinion mounted on the pivot of the horn and serving as means for turning the pivot and horn when the horn is to be reversed, Fig. 1 showing the horn as in reversed or idle position or what will be called the "open" position; 11, a short rack supported in fixed position to be engaged by the pinion as the carriage passes this rack, this rack being disposed inwardly beyond the center of the pinion, so that if the horn reaches the rack when in open position, as shown in Fig. 1, the rack will rotate the pinion and turn the horn to the opposite position, the length of the rack being such as to give the pinion a half-revolution; 12, another rack adapted to engage the pinion at another point in the carriage-circuit and turn the horn into the position shown in Fig. 1, the first-mentioned rack 11 being hereinafter termed the "closing-rack" and rack 12 being termed the "opening-rack;" 13, a projection from the pinion-shaft; 14, a trackway parallel with the guide-grooves 8 and extending along a portion only of the carriage-circuit, this track being adapted to be engaged by the projection 13 when the horn is in closed position, the engagement of the projection with the track serving to maintain the horn firmly in closed position throughout the length of this track; 15, a pair of clasp-like clamps pivoted to the carriage and adapted when closed to neatly embrace the horn when the horn is in closed position, and adapted when open to present their edges upwardly in a plane corresponding with the lower periphery of the horn when the horn is in closed position; 16, a cross-head reciprocating in the carriage at right angles to the path of the carriage-travel; 17, links connecting this cross-head with the clamps so that as the cross-head moves outwardly the clamps are forced into closed position around the horn and as the cross-head moves inwardly the clamps are opened; 18, studs or rollers projecting from the cross-head; 19, a guide-track extending the entire circuit of the carriage and engaged by the studs of the cross-head, the distance of this guide-track from the carriage determining the position of the cross-head and consequently whether the clamps shall be open or closed, a portion of the track corresponding with the open and a portion with the closed position of the clamps; 20, inclined portions of these guide-tracks where the track performs its clamp-closing office; 21, similar inclines where the track is to perform its clamp-opening office; 22, a narrow ledge supported at each side of the machine at about the level of the top of the clamps when the clamps are open; 23, a flat blank supported at its ends upon these ledges, this blank having a width corresponding with the length of the can to be produced and having a length corresponding with the circumference of the can plus the the seam-laps, the two ledges being so disposed as to suit the length of the blank; 24, guide-grooves concentric to the sprocket-wheels 3 and forming virtually a guiding continuation of the ledges 22 half-way around the sprocket-wheels, the width of these guide-grooves being such that the blank may move forward in the grooves without being curved, the blanks thus going into the grooves flat and coming out flat; 25, a pair of lipping-rolls at each side of the machine in the path of the edge of the blank as the blank leaves the curved guide, these rolls serving as the blank passes between them to bend the ends of the blank into a slight seam-bevel, as indicated at 49 in Fig. 3; 26, an acid-pipe leading to each of these pairs of rollers from a suitable source of acid-supply and serving to moisten the rolls with acid, whereby the passage of the blank through the rolls effects the beveling of the blank and the moistening of those bevels with acid; 27, a vessel containing liquid resin; 28, a pipe to be connected with a source of supply of liquid resin for keeping the vessel properly supplied; 29, a disk turned by power and running with its lower edge in the resin-vessel, the disk being so disposed that its upper edge will be traversed by the horn as the carriage brings the horn over the disk; 30, a vessel of melted solder, this vessel being formed of two divisions, as shown in Fig. 2, the partition between the two compartments being perforated, as shown, so that melted solder may occupy both compartments, the intention being that lumps of solder will be placed in the right-hand compartment, solder thus being kept from the left-hand compartment until melted, the solder being melted in the vessel by any suitable arrangement of fire or gas-jets under the vessel; 31, a solder-applying disk revolved by power and with its lower edge running in the left-hand compartment of the solder-vessel and always dipping into the solder, the upper edge of this disk being in position to be traversed by the horn and the disk driven by power in a direction the opposite of that traveled by the horn as the horn passes it, this disk being preferably hollow and provided with gas-ajutages near its periphery, the gas being supplied through the hollow shaft of the disk; 32, a second soldering-disk farther along in the circuit, this disk being revolved by power in a direction opposite that of disk 31; 33, the hollow shafts of the soldering-disks, through which they receive their supply of heating-gas; 34, a longitudinally-disposed runner-ended soldering-rib placed farther along in the circuit of the machine in position to be rubbed by the horn, this rib to be kept heated by any suitable or ordinary arrangement of gas-jets; 35, a metallic box open below and having this soldering-rib mounted in and projecting upward from its top, the box being mounted for oscillation upon a pivot, so that the soldering-rib may rise or fall; 36, a counterbalance-weight to press the soldering-rib upward against the horn as the horn passes;

37, another longitudinally-disposed soldering-rib mounted still farther along in the circuit of the machine, this rib being shown in the exemplification as disposed over the pathway of the horn; 38, a box for supporting this soldering-rib, similar to box 35, the object of these boxes being to present extended surfaces to receive heat from gas-jets and keep the soldering-ribs hot; 39, trunnion-pivots supporting the soldering-rib 37, but permitting it to oscillate and find a position parallel with the horn as the horn travels under it; 40, a stop projecting from one of the trunnions of this soldering-rib and engaging between lugs on the frame and serving to limit the oscillations of the soldering-rib; 41, longitudinal curved grooves in the horn; 42, stripping-fingers supported in fixed position in the circuit prior to the closing-rack 11 and adapted to engage the grooves 41 as the horn passes the fingers, the exemplification showing the fingers as disposed at the end of the machine where the horn travels in an arc, the grooves in the horn having corresponding curved form to permit the proper passage of the fingers; 43, a carbon rib longitudinally disposed in the periphery of the horn at what will be the outside of the horn when the horn is in closed position, the object of this carbon rib being to prevent trouble from the tinning of the horn as the seam is soldered upon it; 44, similar carbon ribs at the extremities of the clamps and for the same purpose; 45, a feed-box to contain a supply of blanks, this box being disposed over the ledges 22 and having dimensions corresponding with the blanks; 46, a series of vertical screws disposed under the feed-box with their peripheries projecting a trifle inward beyond the walls of the box, so that a pile of blanks in the box will rest upon the inwardly-projecting portions of these screws, as will be understood from Fig. 5; 47, worms engaging and driving these screws so as to rotate them all uniformly, these worms to be continuously driven by power through any appropriate and ordinary transmitting-gearing, and at such speed as will give the screws one rotation at each passage of the horn, or of any horn, if a multiplicity of horns be used, as will generally be the case; 48, side guides for the ends of the blanks as they drop from the screws to the ledges; 49, Fig. 3, the seam bevels or lips formed on the ends of the blank by the lipping-rollers; 50, the pipes for supplying gas to the soldering-disks; 51, the pivot which supports the soldering-rib 34; 52, Fig. 5, a pile of blanks supported by the feed-screws, and 53, Fig. 2, an exemplifying gas-jet for heating the solder-vessel.

The feeding of the blanks from the feed-box to the ledges will first be explained. The threads of the screws projecting under the pile of blanks support the pile, and the screws are in continuous rotation in such direction that non-rotary nuts, if upon them, would feed downwardly. At each turn of the screws the lowermost blank of the pile will engage the top threads of the screws, and will begin to travel down the screws and will disengage from all the screws at once and drop upon the ledges. While this blank has been traveling down the screws the screws may have made many rotations, and at each rotation the lowermost blank has been taken from the pile. Consequently a number of blanks will be traveling down the screws continuously and at each rotation one blank will drop from the screws and a new blank will be taken. The feeding motions are of course to be so timed as to drop a blank upon the ledge before each passage of the horn.

Now referring to Fig. 1, in which a blank 23 rests upon the ledges, the complete cycle of events of the machine may be studied, it being understood that the sprocket-wheels turn continuously in the direction of the arrow, thus carrying the horn to the right from the position shown. As the horn advances the open clamps will pass under the blank and the back of the carriage will engage the rear edge of the blank, and then the blank will advance with the carriage and will be pushed along the ledges and follow the curved guides 24, which, however, are so wide as not to curve the blank. The carriage continuing its motion pushes the blank through the lipping-rolls, which bevel the ends of the blank and moisten those bevels with acid. During all this time the blank has simply rested upon the open clamp, but has been prevented from falling therefrom by the curved guide-groove. This guide-groove does not extend beyond the lipping-rolls, and if the blank were unsupported it would fall from the clamps; but before the blank leaves the lipping-rolls the horn-pinion is engaged by the closing-rack 11 and the horn is tipped over into closed position, so that the blank is clamped between the horn and the open clamps, the projection 13 then engaging the track 14, so that the horn is maintained firmly in this position. A slight advance of the carriage causes the incline 20 to close the clamps around the horn, thus bending the blank around the horn and overlapping the edges to form the seam, the clamps holding the blank snugly to the horn and near the seam, the form of the groove 19 maintaining the clamps firmly in this position. The carriage thus has the blank bent to form and clamped around the horn with beveled laps moistened with acid—in fact, a can-body ready for soldering. It now passes the revolving resin-disk 29, which applies resin to the seam. It then passes the soldering-disk 31, which applies solder freely to the seam, the disk running against the direction of advance of the seam. It then passes over the soldering-disk 32, whose direction of motion is with the seam, this disk producing upon the seam the action of a rolling soldering-iron itself, supplied with solder. The seam then passes along the soldering-rib 34, which "soaks" the seam, the pivoted hanging of this rib permitting the rib to bear upon the seam with yielding pressure. The can-body is then carried along the circuit and is subjected to the action of the solder-rib 37, which gives the seam a still further soaking, and, if needed, this action may be carried as far as desired by simply adding to the number of soldering-ribs disposed in the circuit. The carriage still advances and incline 21 opens the clamps and the pinion engages the opening-rack 12 and tips the horn back to the open position shown in Fig. 1, track 14 having terminated so that projection 13 may cease its duty and permit the horn to swing back. This leaves the seamed body on the back-tipped horn and leaves the clamps open. Meanwhile a new blank has taken its place on the ledges, and the carriage picks up this blank as before and carries it forward. When the horn reaches the stripping-fingers 42, these fingers strip the can-body from the horn and the cycle is repeated precisely as before. The can-bodies as they are stripped from the horn may fall to any suitable receptacle or conveying apparatus.

The machine may be as long as desired, and the only limit to the number of carriages with which the machine may be provided is the necessity for having room enough between carriages to permit a horn to take its open position without interfering with the carriage immediately following.

I claim as my invention—

1. In a can-machine, the combination, substantially as set forth, with a series of soldering appliances disposed in a line, of a carriage, mechanism for moving the carriage in a path parallel with said line, and a cylindrical horn mounted on said carriage with its axis parallel to the path of movement of the carriage and attached to said carriage by one end only and overhanging its attachment a distance equal to the length of the can-body.

2. In a can-machine, the combination, substantially as set forth, with a series of soldering appliances disposed in a line, of a carriage, mechanism for moving the carriage in a path parallel with said line, and an overhanging cylindrical horn mounted on said carriage and supported by one end only, with its axis parallel to the path of movement of the carriage and provided with a longitudinal carbon rib.

3. In a can machine, the combination, substantially as set forth, with a series of soldering appliances disposed in a line, of a carriage, mechanism for moving the carriage in a path parallel with said line, and an overhanging cylindrical horn mounted on said carriage with its axis parallel to the path of movement of the carriage and provided with a longitudinal peripheral groove adapted to receive a stripping-finger.

4. In a can-machine, the combination, substantially as set forth, with a series of soldering appliances disposed in a line, of a carriage, mechanism for moving the carriage in a path parallel with said line, and an overhanging cylindrical horn mounted on said carriage with its axis parallel to the path of movement of the carriage and connected with the carriage by a pivot at right angles to said line and path to permit the horn to reverse its position on the carriage.

5. In a can-machine, the combination, substantially as set forth, with a series of soldering appliances disposed in a line, of a carriage, mechanism for moving the carriage in a path parallel with said line, an overhanging cylindrical horn mounted on said carriage with its axis parallel to the path of movement of the carriage, and a pair of clamps pivoted to the carriage and adapted to open and close upon the horn and travel with the horn.

6. In a can-machine, the combination, substantially as set forth, with a series of soldering appliances disposed in a line, of a carriage, mechanism for moving the carriage in a path parallel with said line, a cylindrical overhanging traveling horn mounted on said carriage with its axis parallel to the path of horizontal movement of the carriage, and a pair of clamps pivoted to the carriage and adapted to open and close upon and travel with the horn and to present when open their edges in a common horizontal plane parallel to the axis of the horn.

7. In a can-machine, the combination, substantially as set forth, with a series of soldering appliances disposed in a line, of a carriage, mechanism for moving the carriage in a path parallel with said line, a cylindrical horn mounted on said carriage with its axis parallel to the path of horizontal movement of the carriage and pivoted to the carriage so as to be capable of reversing thereon, and a pair of clamps pivoted to the carriage and adapted to open and close upon the horn when the horn is in normal position.

8. In a can-machine, the combination, substantially as set forth, with a series of soldering appliances disposed in a line, of a carriage, mechanism for moving the carriage in a path parallel with said line, a cylindrical horn mounted on said carriage with its axis parallel to the path of movement of the carriage, and a pair of fixed blank-supporting ledges disposed one at each side of the machine and outwardly beyond the width of the carriage.

9. The combination, substantially as set forth, with an open-bottom box adapted to receive a pile of blanks, of a series of vertical screws disposed below the lower edge of the box and projecting their threaded peripheries inwardly beyond the wall of the box and arranged for rotation in unison.

10. In a can-machine, the combination, substantially as set forth, with appliances for moving a can-body in a path parallel to its longitudinal seam, of a rotary soldering-disk with its periphery in the line of movement of said seam, a solder-vessel below the disk, and a runner-ended soldering-rib arranged in said line beyond said disk and adapted to rub upon the solder deposited on the seam by said disk.

11. In a can-machine, the combination, substantially as set forth, with appliances for moving a can-body in a path parallel to its longitudinal seam, of a hollow rotary soldering-disk, with its periphery in the line of movement of said seam and provided with gas-ajutages in its surface and a gas-supply pipe communicating with said ajutages.

12. In a can-machine, the combination, substantially as set forth, with appliances for moving a can-body in a path parallel to its longitudinal seam, of a rotary soldering-disk with its periphery in the line of movement of said seam and a second soldering-disk in line with the first one, said two soldering-disks being arranged for rotation in opposite directions.

13. In a can-machine, the combination, substantially as set forth, with appliances for moving a can-body in a path parallel to its longitudinal seam, of a rotary soldering-disk with its periphery in the line of movement of said seam and a soldering-vessel below the disk and provided with a perforated partition dividing said vessel into two compartments, one of which is dipped into by said disk.

14. In a can-machine, the combination, substantially as set forth, of a carriage, an endless guide therefor, mechanism for moving the carriage thereon in a circuit, a traveling overhanging horn carried by the carriage with its axis parallel to the path of carriage movement, clamps pivoted to the carriage, and blank-feeding and blank-beveling and seam-soldering appliances disposed along said circuit and adapted to be engaged successively by said carriage.

15. In a can-machine, the combination, substantially as set forth, of two shafts, chains thereon, a carriage moved by said chains in a continuous path partly straight and partly curved, an overhanging cylindrical horn mounted on the carriage with its axis parallel to the path of movement of the carriage, and soldering appliances arranged at the straight part of said continuous path.

JOHN B. FOOTE.

Witnesses:
J. W. SEE,
I. N. SLAYBACK.